United States Patent Office 2,850,460
Patented Sept. 2, 1958

2,850,460
ODOR STABILIZED DETERGENT COMPOSITION

Martin E. Ginn, Dayton, and Lloyd E. Weeks, Union, Ohio, assignors to Monsanto Chemical Company, St. Louis, Mo., a corporation of Delaware No Drawing. Application March 27, 1956
Serial No. 574,079

3 Claims. (Cl. 252—153)

An object of the present invention is to prevent tridecyl-$\beta$-sulfopropionate detergent formulations from developing undesirable odors. A further object is to provide an efficient dishwashing detergent composition free from objectionable odors.

Tridecyl-$\beta$-sulfopropionate formulations, particularly sodium tridecyl-$\beta$-sulfopropionate formulations, are remarkably efficient detergents, especially as dishwashing formulations. Tridecyl-$\beta$-sulfopropionates and detergent formulations containing such sulfopropionates are disclosed and claimed in the copending application of Milton Kosmin, Serial No. 311,777, filed September 26, 1952, and abandoned May 8, 1957.

While the tridecyl-$\beta$-sulfopropionates are a very effective detergent, it happens that these compounds upon aging or in use have a tendency to develop an undesirable odor—an odor which can be described as a combination of an acrylate odor and a tridecanol odor. It has now been discovered that the development of this odor can be retarded or prevented by simply adding a small amount of an ethylenediamine acetic acid salt to the tridecyl-$\beta$-sulfopropionates or to compositions containing the tridecyl-$\beta$-sulfopropionates.

The tridecyl-$\beta$-sulfopropionates used in the present invention are the alkali, alkaline earth, or ammonium salts of the $\beta$-sulfopropionic acid ester of tridecyl alcohol, the tridecyl alcohol being obtained according to the "Oxo" process by the reaction of carbon monoxide with a hydrocarbon selected from the group consisting of triisobutylene and tetrapropylene. The sodium salt is preferred, although potassium, calcium, magnesium, etc. salts can be used. The sulfopropionate compounds have the formula:

ROCOCH$_2$CH$_2$SO$_3$M in which R is a tridecyl radical derived from said tridecyl alcohol, and M is a cation selected from the class consisting of alkali metal, alkaline earth metal, and ammonium. The term "tridecyl alcohol" is used in the present specification and claims to designate the above referred to C–13 alcohol prepared by the "Oxo" process.

The tridecyl-$\beta$-sulfopropionate salts used in the present invention can be prepared by adding an ammonium or alkali metal bisulfite to tridecyl acrylate, or by hydrolyzing an alkali metal or ammonium sulfopropionitrile and condensing the hydrolyzed product with tridecyl alcohol, both of which methods are described in the aforesaid application Serial No. 311,777. Of course, suitable tridecyl-$\beta$-sulfopropionate salts can be used regardless of the method of preparation.

The sodium tridecyl-$\beta$-sulfopropionate used to obtain the data in Table I below was prepared according to the following procedure:

Metasodium bisulfite, 210 grams and 200 grams water were charged to a reactor and heated to 50° C. with stirring, and 6 grams sodium hydroxide, 240 grams absolute ethyl alcohol, and 0.4 grams monoethyl ether of hydroquinone were added. The mixture was heated to 78° C. and 503 grams tridecyl acrylate was added dropwise over a 1 hour and 40 minute period. The mixture was refluxed 1½ hours and cooled, and 200 grams ethyl alcohol was added. The mixture was neutralized to pH 7.5 with 53 grams of 40% NaOH, and filtered. The filter cake was washed with two 200-gram portions of 90% hot ethyl alcohol. The filtrate was stripped of solvent to a weight of 1213 grams. This product can be diluted to the desired solids concentration with water and ethanol, or other solvents. Or, the product can be dried in a vacuum overnight at about 50° C. to form a solid powder. The solid product, having a tridecanol odor, can be further purified by washing with acetone; for example, a 442 gram portion of solids was washed with two 300-ml. portions of acetone, filtered, and the filter cake washed with two 200-ml. portions of acetone and dried at 50° C. under vacuum to give 395 grams of odor free product. It is preferred to use an acetone-washed or otherwise purified sulfopropionate in the formulations of the present invention, although it is not essential as ethylene diamine tetracetic acid salts will retard the development of odors even in impure tridecyl-$\beta$-sulfopropionate mixtures. The tridecyl-$\beta$-sulfopropionate used in the formulations of Table I below was acetone-washed. The tridecyl alcohol used in preparing the above tridecyl acrylate was obtained by an "Oxo" process reaction of carbon monoxide and tetrapropylene.

The ethylene diamine acetic acid salts present in our detergent compositions are salts of N,N'-substituted ethylene diamines in which the two amino groups are tertiary amines, and in which there are at least three acetic acid salt forming groups. These salts conform to the formula:

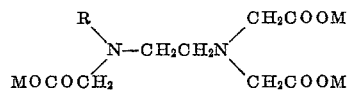

in which R is —CH$_2$COOM, or an organic radical, e. g., an alkyl group or a hydroxyalkyl group, and in which M is hydrogen or a salt-forming cation, e. g., ammonium, or an alkali or alkaline earth metal, such as sodium, potassium, magnesium, calcium, etc., and in which at least one M is a salt-forming cation. The preferred salts are the ethylene-diamine N,N,N',N'-tetracetic acid salts, particularly the sodium salts containing one to four sodium ions per molecule. Organic radicals represented by R in the above formula are, for example, ethyl, 2-hydroxyethyl, methyl, propyl, hexyl, etc.

In the past, ethylene-diamine-tetracetic acid salts have been used to prevent soaps and certain sulfonated and sulfated detergent compounds from becoming rancid. However, these prior art compositions did not present a problem comparable to the present tridecyl-$\beta$-sulfopropionate compounds which are not only subject to hydrolysis at the tridecyl alcohol-propionic acid ester linkage, but which are also particularly susceptible to dehydrosulfonation to leave a vile-smelling acrylate compound, CH$_2$=CH—COO—. With the tridecyl-$\beta$-sulfopropionate compounds of the present invention, the use of buffering agents to retard hydrolysis of the ester linkage had little or no effect upon the odor. There are many anti-oxidant and stabilizing compositions known to the art, but ethylene diamine acetic acid salts are the only agents which have as yet been found to be effective in retarding the development of odor in tridecyl-$\beta$-sulfopropionate compositions.

The ethylene-diamine-tetracetic acid salts are especially effective in detergent compositions which contain magnesium salts, particularly magnesium dodecylbenzenesulfonate, along with the tridecyl-$\beta$-sulfopropionates. The magnesium salts are useful in improving the foam stability of the detergent formulations. However, the magnesium salts appear to catalyze the decomposition of the tridecyl-β-sulfopropionates, so the ethylene-diamine-tetraacetic acid salts are especially useful in retarding odor development in tridecyl-β-sulfopropionate formulations containing magnesium salts.

For convenience herein the sodium salt of tridecyl-β-sulfopropionate will be designated as STBSP, and the sodium salts of ethylene-diamine-tetracetic acid will be designated as EDTA.

The following Tables I and II illustrate the odor stabilizing effect of the ethylene-diamine-tetracetate salts in STBSP formulations. The samples of formulations were aged in an oven at 50° C., and the effects on the pH and odor of the formulations was observed. The tests were run using STBSP formulations having the following compositions:

| STBSP I | STBSP II |
|---|---|
| 40% STBSP<br>15% ethanol<br>45% water | 30% STBSP<br>10% magnesium dodecyl-benzenesulfonate.<br>20% ethanol.<br>40% water. | all percentages being by weight. For the tests of STBSP formulations containing EDTA, a stated percent by weight of EDTA was added, based on the total weight of the above formulations.

1 mole of C-12 coconut oil fatty acid with 2 moles of diethanolamine.

It is apparent from the data in Tables I and II that EDTA is a very effective odor stabilizer for tridecyl-β-sulfopropionate formulations. The STBSP used in the formulations of Table II had not been purified as carefully as that used in Table I, but even so, the EDTA prevented odor development.

As shown in Tables I and II, ethylene diamine tetraacetic acid has a remarkable ability to retard odor formation in STBSP formulations. Other amino compounds and basic salts had little or no effect on odor formation.

It is of interest that the EDTA prevented odor development even though it apparently did not prevent hydrolysis of the STBSP ester linkage; the development of an acid pH upon aging indicates that some hydrolysis had occurred.

In view of the good odor retarding ability of EDTA in the STBSP formulations, tests were conducted to determine whether EDTA had any effects on the performance of the formulations. The following table shows the results of foam stability tests run with STBSP formulations containing 0.1% EDTA diluted to 0.10% solids concentrations in both hard and soft water.

Table I

| Sample | Initial | | After 2 days | | After 1 week | |
|---|---|---|---|---|---|---|
| | pH | Odor | pH | Odor | pH | Odor |
| STBSP II | 7.23 | None (ethanol) | 6.16 | Unpleasant | 5.45 | V. bad. |
| STBSP II+10% ninol AA-62 | 7.50 | None | 6.58 | do | 6.25 | Do. |
| STBSP II+1% Na₃ citrate | 7.13 | do | 6.20 | do | 5.28 | Do. |
| STBSP II+0.5% EDTA | 7.13 | do | 5.37 | None | 5.20 | None. |
| STBSP I | 7.28 | do | 6.30 | Unpleasant | 5.27 | Unpleasant. |
| STBSP I+10% ninol AA-62 | 7.12 | do | 6.72 | Slightly unpleasant | 6.32 | Slightly unpleasant. |
| STBSP I+1% Na₃ citrate | 7.36 | do | 6.56 | do | 6.16 | Do. |
| STBSP I+0.5% EDTA | 7.43 | do | 6.40 | None | 6.18 | None. |

Table II

| Example | Initial | | After 5 days | |
|---|---|---|---|---|
| | pH | Odor | pH | Odor |
| STBSP II | 7.00 | None | 5.64 | V. bad. |
| STBSP II+0.1% EDTA | 7.33 | do | 5.88 | None. |
| STBSP I | 7.12 | do | 5.70 | V. bad. |
| STBSP I+0.1% EDTA | 7.12 | do | 5.95 | None. |

The EDTA added in the formulations in Tables I and II was the disodium salt of ethylene-diamine-tetracetic acid. The formulations were adjusted to the initial pH by the addition of sodium hydroxide or sulfuric acid as necessary. The Ninol AA-62 stabilizer in Table I is a fatty acid amide of diethanolamine formed by reacting

Table III

| Sample formulation | Water hardness (p. p. m.) | Volume foam (ml.) per units soil added | | | | | | |
|---|---|---|---|---|---|---|---|---|
| | | Initial | 1 | 2 | 3 | 4 | 5 | 6 |
| STBSP II | 0 | 280 | 275 | 270 | 260 | 200 | 55 | 20 |
| STBSP II+0.1% EDTA | 0 | 275 | 270 | 265 | 260 | 150 | 60 | 25 |
| STBSP II | 300 | 245 | 240 | 230 | 150 | 80 | 50 | 35 |
| STBSP II+0.1% EDTA | 300 | 235 | 230 | 225 | 135 | 70 | 45 | 35 |

The above data indicate that the STBSP formulations containing EDTA have very good foam stability, being substantially equivalent to the STBSP formulations without EDTA.

The following table illustrates the effectiveness of magnesium dodecylbenzenesulfonate (in STBSP II) in improving foam stability of STBSP formulations, particularly in soft water.

Table IV

| Sample Formulation | Water hardness (p. p. m.) | Initial | Volume Foam (ml.) per Units Soil Added | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| STBSP I | 0 | 260 | 260 | 255 | 170 | 15 | | | | | | | | |
| STBSP II | 0 | 270 | 270 | 265 | 265 | 170 | 70 | 25 | | | | | | |
| STBSP I | 300 | 270 | 275 | 270 | 210 | 100 | 60 | 40 | 35 | 35 | 30 | 30 | 25 |
| STBSP II | 300 | 260 | 260 | 260 | 160 | 80 | 50 | 45 | 40 | 40 | 35 | 35 | 30 | 25 |
| Commercial A | 0 | 270 | 250 | 235 | 95 | 40 | 15 | | | | | | | |
| Do | 300 | 150 | 50 | 25 | | | | | | | | | | |

The above data are for 0.1% solids concentration. The data in Tables III and IV above and the following tables were obtained by the dynamic foam stability test.
Commercial A is a popular manual dishwashing detergent.

The dynamic foam stability test used to measure the foam stability of the detergent formulations of the present invention was adopted from the test reported by L. E. Weeks, et al., "A Dynamic Foam Test for Evaluation of Hand Dishwashing Compositions," J. Am. Oil Chem. Soc. 31, 254–257 (1954). In the present test, one hundred ml. of sample at the specified solids concentration in 0 or 300 p. p. m. hard water is preheated to 130–132° F. and transferred to a graduated cylinder which has been suspended in an air bath so as to allow the test solution to cool at a rate similar to that in practical dishwashing. An electric stirrer which operates at 3000 R. P. M. is lowered into the graduated cylinder containing the sample solution to a position in which the dual-bladed stirrer with a combined blade length of 1¾" is located 13 mm. above the inside bottom of the cylinder. One minute after the pouring, stirring is started and continued for 120 seconds. The solution is then allowed to rest for 30 seconds, at the end of which time the foam volume in ml. above the 100 ml. mark is recorded. After the foam has been recorded, 0.125 gram portions of soil are added. After each addition, the solution is stirred one minute, allowed to rest one minute, and the foam volume is recorded. These additions of soil are continued until the foam volume has been reduced to at least 25 ml.

The graduated cylinder used in this procedure was a 1000 ml. cylinder cut off at the 600 ml. mark and having an inside diameter of 6 cm. The air bath was an empty 3000 ml. beaker immersed in a 25° C. water bath.

The soil used in this test had the following composition:

25% edible tallow
25% vegetable oil (Mazola)
24% hydrogenated shortening (Crisco)
25% white wheat flour
1% oleic acid
0.03% fluorescent dye The data in the following table indicates that our preferred formulation containing STBSP and magnesium dodecylbenzensulfonate is superior to two of the best liquid dishwashing detergents on the market.

Table V

| Sample formulation | Solids concentration (percent) | Volume foam (ml.) per units soil added | | | | | | |
|---|---|---|---|---|---|---|---|---|
| | | Initial | 1 | 2 | 3 | 4 | 5 | 6 |
| Commercial B | 0.10 | 260 | 235 | 130 | 35 | 20 | | |
| Do | 0.08 | 240 | 240 | 105 | 15 | | | |
| STBSP II+EDTA | 0.10 | 270 | 270 | 265 | 260 | 150 | 60 | 25 |
| Do | 0.08 | 260 | 250 | 130 | 30 | 15 | | |
| Commercial C | 0.10 | 265 | 260 | 105 | 10 | | | |

The above tests were conducted in distilled water.

To an STBSP-II formulation, 0.1% of the tetrasodium salt of ethylenediamine tetracetic acid was added, and a dynamic foam stability test was conducted, using a 0.1% solids concentration, with the results given in Table VI.

chelating agent and remove metal or other ions which would catalyze the decomposition of STBSP. However, the mechanism of the odor stabilizing effect is not clear, and we do not wish to be bound by any theory of the cause of the odor stabilizing effect.

Ethylene-diamine-acetic acid salts will have an odor retarding effect in any detergent formulations containing tridecyl-β-sulfopropionate salts. Of course, the ethylene-diamine-acetic acid salts can be mixed with the tridecyl-β-sulfopropionate salts either before or after addition to other ingredients of detergent formulations. While the sodium salts of these materials are preferred, it will be understood that other salts can be used; the salts are ionized to a considerable extent in aqeuous solution, and, in fact there is an exchange of cations among the various salts in solution. For example, when sodium tridecyl-β-sulfopropionate and magnesium dodecylbenzenesulfonate are added to an aqueous solution, some magnesium tridecyl-β-sulfopropionate and sodium dodecylbenzenesulfonate will be present at equilibrium. Moreover, when around 0.1% EDTA is added to a tridecyl-β-sulfopropionate detergent solution, it makes little difference whether the EDTA is added as the mono- or tetra-sodium salt, or even as the free acid as equilibrium with sodium ions already in the solution will quickly be reached; such sodium ions will usually be present from salts or alkali used in the detergent formulations.

Our odor-stabilized tridecyl-β-sulfopropionates can be used for various detergent purposes, alone, or along with various other detergents, soaps, dyes, builders, such as sulfates and phosphates, fillers, etc. However, our compositions are particularly good as dishwashing detergents, especially as hand dishwashing detergents, and the following formulation is preferred for this use:

30 parts STBSP
10 parts magnesium p-dodecylbenzenesulfonate
20 parts ethanol
40 parts water
0.1 part EDTA all parts being by weight. This solution makes a convenient liquid detergent for use in washing dishes (adding the liquid detergent to the dishwater). However, all of the solids can be mixed together to form a dry mixture, which can be added to the aqueous ethanol solution before use. While it is less convenient, all of the solid materials can be separately added to dishwater.

The above proportions of our preferred formulation can be varied to some extent, for example:

25 to 35 parts STBSP
5 to 15 parts magnesium dodecylbenzenesulfonate
15 to 25 parts ethanol
at least 40 parts water
0.05 to 0.5 part EDTA It is desirable that all of the solids be in solution, and therefore the total solids should not constitute more than about 45% of the formulation, and preferably not more than 40%. The EDTA must be present in an odor Table VI

| Sample formulation | Water hardness (p. p. m.) | Volume foam (ml). per units soil added | | | | | | | | | | | | |
|---|---|---|---|---|---|---|---|---|---|---|---|---|---|---|
| | | Initial | 1 | 2 | 3 | 4 | 5 | 6 | 7 | 8 | 9 | 10 | 11 | 12 |
| STBSP II+.1% EDTA | 0 | 285 | 290 | 285 | 260 | 135 | 50 | 25 | | | | | | |
| Do | 300 | 260 | 275 | 270 | 235 | 65 | 50 | 45 | 40 | 40 | 35 | 30 | 30 | 25 |

No acrylate or tridecanol odor was detected on generating foam with the above formulation in hot water.

It is clear that EDTA prevents the development of odors in STBSP formulations, probably by preventing the formation of acrylic acid, acrylates, or other compounds possessing offensive odors. The EDTA may act as a stabilizing amount which will vary to some extent with the purity of the STBSP and the concentration of metallic ions in the water. Amounts from 0.05% to 0.5% by weight of the EDTA are usually satisfactory and amounts up to 1% or even 5% or more can be used, although such amounts are undesirable as the EDTA will not ordinarily be soluble to this extent.

The magnesium dodecylbenzenesulfonate in the STBSP II formulation was made by reacting p-dodecylbenzenesulfonic acid in aqueous ethanol solution with a molar excess of magnesium carbonate at 78°, cooling, adjusting to pH 8 with sodium hydroxide, and filtering.

We claim:

1. A detergent composition useful in washing dishes consisting of a tridecyl-$\beta$-sulfopropionate salt and a small amount no greater than 5% of the composition of an ethylene-diamine-tetracetic acid salt in which salt-forming cations are selected from the group consisting of ammonium, sodium, potassium, magnesium and calcium as an odor stabilizer and in which the sulfopropionate salt is selected from the group consisting of the sodium, potassium, calcium and magnesium salts of the $\beta$-sulfopropionate of tridecyl alcohol, said tridecyl alcohol being obtained according to the Oxo process reaction of carbon monoxide with a hydrocarbon selected from the group consisting of triisobutylene and tetrapropylene.

2. A liquid detergent composition comprising 25 to 35 parts sodium tridecyl-$\beta$-sulfopropionate, 5 to 15 parts magnesium dodecylbenzenesulfonate, 15 to 25 parts ethanol, 0.05 to 0.5 part of a sodium ethylene-diamine-tetracetic acid salt, and the balance of at least 40 parts being water to make a total of about 100 parts, all parts being by weight.

3. A liquid detergent composition comprising 30 parts sodium tridecyl-$\beta$-sulfopropionate, 20 parts ethanol, 10 parts magnesium dodecylbenzenesulfonate, 0.1 part of a sodium ethylene-diamine-tetracetic acid salt, and 40 parts water to make a total of about 100 parts, all parts being by weight.

References Cited in the file of this patent

UNITED STATES PATENTS

| 2,166,144 | Harris | July 18, 1939 |
| 2,550,691 | Harris | May 1, 1951 |
| 2,624,766 | Butler | Jan. 6, 1953 |
| 2,723,240 | Baumgartner | Nov. 8, 1955 |

FOREIGN PATENTS

| 519,230 | Great Britain | Mar. 20, 1940 |

OTHER REFERENCES

Versene, Tech. Bull. No. 1, pp. 2, 15 (1949), Tech. Bull No. 2, pp. 10–12 (July 1952), pub. by Bersworth Chemical Co., Framingham, Mass.

Sequestrene, pp. 42, 43, pub. by Geigy Chemical Corp., N. Y. (1952).